US009992231B2

(12) United States Patent
Li et al.

(10) Patent No.: US 9,992,231 B2
(45) Date of Patent: Jun. 5, 2018

(54) METHOD AND APPARATUS FOR DATA PROTECTION IN CLOUD-BASED MATCHING SYSTEM

(71) Applicant: International Business Machines Corporation, Armonk, NY (US)

(72) Inventors: Hong Bo B B Li, Beijing (CN); Chang Rui Ren, Beijing (CN); Yue Y T Tong, Beijing (CN); Bao Hua B H Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/967,466

(22) Filed: Dec. 14, 2015

(65) Prior Publication Data

US 2017/0171248 A1    Jun. 15, 2017

(51) Int. Cl.
*G06F 21/00* (2013.01)
*H04L 29/06* (2006.01)
*G06Q 10/06* (2012.01)
*H04L 29/08* (2006.01)
*G06F 21/62* (2013.01)

(52) U.S. Cl.
CPC .......... *H04L 63/20* (2013.01); *G06F 21/6254* (2013.01); *G06Q 10/06311* (2013.01); *H04L 67/1097* (2013.01)

(58) Field of Classification Search
CPC .................................................. G06F 21/6245
USPC ......................................................... 726/28
See application file for complete search history.

(56) References Cited

U.S. PATENT DOCUMENTS

| 8,108,912 B2 * | 1/2012 | Ferris ..................... G06F 21/606 709/201 |
| 8,539,597 B2 * | 9/2013 | Arasaratnam ......... G06F 21/602 726/26 |
| 8,654,971 B2 * | 2/2014 | Orsini ..................... H04L 9/085 370/228 |
| 9,330,245 B2 * | 5/2016 | Maron ..................... G06F 21/31 |
| 9,628,471 B1 * | 4/2017 | Sundaram ............. H04L 63/083 |
| 2003/0233310 A1 * | 12/2003 | Stavrovski ............. G06Q 30/08 705/37 |
| 2006/0224760 A1 * | 10/2006 | Yu ......................... H04L 65/607 709/231 |
| 2009/0204727 A1 * | 8/2009 | Wang ..................... H04L 12/66 709/246 |

(Continued)

OTHER PUBLICATIONS

Cherian et al.; "Providing Data Protection as a Service in Cloud Computing"; International Journal of Scientific and Research Publications, vol. 3, Issue 6, Jun. 2013, entire article.

*Primary Examiner* — Morshed Mehedi
*Assistant Examiner* — Badri Champakesan
(74) *Attorney, Agent, or Firm* — Whitham, Curtis & Cook, PC; Kevin Razavi

(57) ABSTRACT

Enhanced security is provided for cloud based matching systems by using the principle of Independence of Irrelevant Alternatives (IIA). The client uses IIA to transform alternative data before sending it to the cloud, and then does the reverse transformation on the matching results generated by the cloud service provider to rebuild the matching results for the alternative data. Using this protocol, the client does not disclose its own data in a form that is usable by the cloud service provider, and the cloud service provider does not disclose to the client the provider's proprietary coefficient beta information.

4 Claims, 9 Drawing Sheets

110

| ID | Name | Pay Grade | Proficiency level for Business Type 1 | Proficiency level for Business Type 2 | Proficiency level for Business Type 3 | ... |
|---|---|---|---|---|---|---|
| 1 | Tom | 6 | 3 | 2 | 1 | ... |
| 2 | John | 7 | 2 | 2 | 3 | ... |
| 3 | Cynthia | 7 | 3 | 3 | 1 | ... |
| ... | | | | | | |

120

| Shift | Work Load for Business Type 1 | Work Load for Business Type 2 | Work Load for Business Type 3 | ... |
|---|---|---|---|---|
| Monday Morning | 300 | 200 | 100 | |

(56) References Cited

U.S. PATENT DOCUMENTS

| | | | | |
|---|---|---|---|---|
| 2009/0234710 | A1* | 9/2009 | Belgaied Hassine | G06Q 30/02 705/7.29 |
| 2011/0071874 | A1* | 3/2011 | Schneersohn | G06Q 30/02 705/7.32 |
| 2011/0246766 | A1* | 10/2011 | Orsini | G06F 11/1076 713/160 |
| 2011/0295986 | A1* | 12/2011 | Ferris | G06F 9/5072 709/222 |
| 2012/0208500 | A1* | 8/2012 | Ledlie | H04M 1/67 455/410 |
| 2013/0030761 | A1* | 1/2013 | Lakshminarayan | G06K 9/6219 702/179 |
| 2014/0040446 | A1* | 2/2014 | Cohen | G06F 9/5055 709/223 |
| 2014/0201824 | A1* | 7/2014 | Agbabian | G06F 21/6245 726/6 |
| 2014/0250491 | A1* | 9/2014 | Fleischman | H04L 63/20 726/1 |
| 2015/0088609 | A1* | 3/2015 | Wagner | G06Q 10/04 705/7.32 |
| 2015/0100384 | A1* | 4/2015 | Ettl | G06Q 30/0206 705/7.35 |
| 2015/0123967 | A1* | 5/2015 | Quinn | G06T 13/40 345/420 |
| 2015/0304331 | A1* | 10/2015 | Nakagawa | G06F 21/6245 726/28 |
| 2015/0381740 | A1* | 12/2015 | Gwin | H04L 67/142 709/228 |
| 2016/0036893 | A1* | 2/2016 | Pomerantz | H04L 47/70 709/201 |
| 2016/0092771 | A1* | 3/2016 | Buckley | H04L 67/02 706/52 |
| 2016/0292600 | A1* | 10/2016 | Alex | G06Q 10/0637 |
| 2016/0300180 | A1* | 10/2016 | Curtland | G06F 3/04842 |
| 2017/0068962 | A1* | 3/2017 | Panchamgam | G06Q 30/01 |
| 2017/0104736 | A1* | 4/2017 | Seul | G06F 21/6218 |
| 2017/0142096 | A1* | 5/2017 | Reddy | H04L 63/0823 |

* cited by examiner

110

| ID | Name | Pay Grade | Proficiency level for Business Type 1 | Proficiency level for Business Type 2 | Proficiency level for Business Type 3 | ... |
|---|---|---|---|---|---|---|
| 1 | Tom | 6 | 3 | 2 | 1 | ... |
| 2 | John | 7 | 2 | 2 | 3 | ... |
| 3 | Cynthia | 7 | 3 | 3 | 1 | ... |
| ... | | | | | | |

111 112 113 114 115

120

| Shift | Work Load for Business Type 1 | Work Load for Business Type 2 | Work Load for Business Type 3 | ... |
|---|---|---|---|---|
| Monday Morning | 300 | 200 | 100 | |

| ID | Name | Risk Preference | Saving | Monthly Income | Monthly expenses | ... |
|---|---|---|---|---|---|---|
| 1 | Customer1 | 7 | $100,000.00 | $5,000.00 | $3,000.00 | ... |
| 2 | Customer2 | 5 | $200,000.00 | $1,000.00 | $1,500.00 | ... |
| 3 | Customer3 | 3 | $300,000.00 | $2,000.00 | $2,000.00 | ... |
| ... | | | | | | |

210

| Name | Duration | Risk Level | Investment Direction | ... |
|---|---|---|---|---|
| Financial Product 1 | 12 Months | 8 | Stock | |

| ID | Name | Pay Grade | Proficiency level for Business Type 1 | Proficiency level for Business Type 2 | Proficiency level for Business Type 3 |
|---|---|---|---|---|---|
| 1 | Tom | 6 | 3 | 2 | 1 |
| 2 | John | 7 | 2 | 2 | 3 |
| 3 | Cynthia | 7 | 3 | 3 | 1 |

520

| ID | Name | Pay Grade | Proficiency level for Business Type 1 | Proficiency level for Business Type 2 | Proficiency level for Business Type 3 |
|---|---|---|---|---|---|
| 1 | Tom | 6 | 3 | 2 | 1 |
| 2 | John | 6 | 2 | 1 | 2 |
| 3 | Cynthia | 5 | 1 | 3 | 2 |
| 4 | Tom | 7 | 2 | 1 | 1 |
| 5 | John | 7 | 2 | 2 | 3 |
| 6 | Cynthia | 5 | 3 | 2 | 1 |
| 7 | Tom | 6 | 3 | 3 | 1 |
| 8 | Cynthia | 7 | 3 | 3 | 1 |

530

| ID | Name | Pay Grade | Proficiency level for Business Type 1 | Proficiency level for Business Type 2 | Proficiency level for Business Type 3 |
|---|---|---|---|---|---|
| 1 | Tom | 6 | 3 | 2 | 1 |
| 2 | John | 7 | 2 | 2 | 3 |
| 3 | Cynthia | 7 | 3 | 3 | 1 |
| 4 | Tom | 7 | 2 | 1 | 1 |

540

| ID | Name | Pay Grade | Proficiency level for Business Type 1 | Proficiency level for Business Type 2 | Proficiency level for Business Type 3 |
|---|---|---|---|---|---|
| 4 | Tom | 7 | 2 | 1 | 1 |
| 5 | John | 7 | 2 | 2 | 3 |
| 6 | Cynthia | 5 | 3 | 2 | 1 |

550

| ID | Name | Pay Grade | Proficiency level for Business Type 1 | Proficiency level for Business Type 2 | Proficiency level for Business Type 3 |
|---|---|---|---|---|---|
| 2 | John | 6 | 2 | 1 | 2 |
| 7 | Tom | 6 | 3 | 3 | 1 |
| 8 | Cynthia | 7 | 3 | 3 | 1 |

Figure 5

METHOD AND APPARATUS FOR DATA PROTECTION IN CLOUD-BASED MATCHING SYSTEM

BACKGROUND OF THE INVENTION

Field of the Invention

The present invention generally relates to the protection of data in matching systems, and more particularly to methodologies for protecting sensitive user data from the service provider and for protecting proprietary service provider algorithms from the user.

Background Description

Matching systems are widely used in business solutions. For instance, a system for scheduling workforce in a branch is based on a matching system that chooses a suitable teller for each shift. Another typical example is a financial product recommendation system that relies on a matching system to decide which customers are suitable for a given financial product.

Logit models, especially Multinomial Logit Model (MNL), one of the most widely used discrete choice models, are applied to matching systems in various business analytic systems. In this method, the calculation parameters in the utility function (hereinafter referred as "coefficient vector" or "coefficient beta") are the key to the matching system. The coefficient vector beta is usually generated by advanced algorithms, market investigation, and/or by experts' experience.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Clients tend to use cloud-based matching services because 1) the coefficient beta provided by professional companies has better quality, and can be updated timely, and 2) using the cloud avoids the problem of variation of matching system load in a month. However, if we put a matching system into the cloud, one or both of two options are required in the prior art: (1) transmit "alternative data" of the user to the cloud; (2) transmit provider "coefficient beta" to the client. Both of these options have security problems. Current cloud security methods focus on encryption, authorization and access management, and monitoring. But these methods cannot resolve security concerns in this matching system scenario.

SUMMARY OF THE INVENTION

For the purposes of the present invention, the significant attribute of the cloud computing environment is that application services required by the user are best performed by a provider who performs these services on the other side of a communications boundary, and the application services are such that both the user and the provider desire to protect proprietary information from disclosure to the other party across the communications boundary. It is the intention of the inventors to define "cloud computing environment" or simply "cloud" as any computing environment having this attribute and "cloud based" as referring to this attribute.

It is therefore an object of the present invention to provide a secure methodology for a cloud based matching system.

Another object of the invention is to enable a client to use a cloud service provider (CSP) without disclosing sensitive data to the provider.

A further object of the invention is to enable a cloud service provider (CSP) to use proprietary algorithms to solve matching problems without disclosing coefficient vector data to the client.

Both the alternative data and the coefficient vector are sensitive business data. In current cloud-based matching systems, either the alternative data would be transmitted to the CSP, or the coefficient vector would be transmitted to the user, either of which raises a concern about the security of sensitive data. Encryption cannot solve this problem because the data will always be decrypted before they enter the matching process, and the situation doesn't change that one party will hold the other party's sensitive data. This invention uses two transformations, T1 and T2, and the data transmission process utilizes both transformations. The transformations utilize the principle of Independence of Irrelevant Alternatives (IIA), a mathematical property that most matching systems hold to guarantee the correctness of the result.

The process contains three steps. First, the user uses T1 to transform its alternative data, and the transformed data will have little business value to anyone seeking the original sensitive data. Second, the transformed alternative data are transmitted to CSP and the CSP uses the transformed alternative data and its coefficient vector to calculate the matching result. Third, the matching result is transmitted to the user, and user uses T2 to get the result of its original data.

The business value of this invention is that the sensitive data of both parties can be protected. First, alternative data have been transformed such that users needn't worry about improper use of their sensitive data. Second, the coefficient vector is stored in the cloud server such that CSPs needn't worry about the possibility that their calculation parameters would be leaked. Third, the result of transformed data cannot be directly used; only the user can extract from the cloud results calculations that apply to the original sensitive data.

The invention uses a new approach to protect both the users' and the cloud service provider's (CSP's) data in a matching system. Given the characteristics of one item and all alternatives, a matching system uses a utility function to calculate the probabilities that the item should choose each alternative.

The matching system calculation needs data from two sources:

(1) from the user, alternative data describing the characteristics of the item and all alternatives, and (2) from the service provider, a coefficient vector of the utility function that a) has been well-trained by advanced learning systems and/or b) has been given by experts.

An aspect of the invention is a method for data protection in cloud-based matching systems. In one aspect the method is performed on the client side by transforming alternative client data using the principle of Independence of Irrelevant Alternatives (IIA), receiving calculated results of matching upon the transformed alternative data, and rebuilding a final result for said alternative client data by a reverse transformation on the calculated results using the principle of IIA. In another aspect the method is performed by a cloud service provider by receiving from the client alternative client data transformed using the principle of Independence of IIA, calculating results of matching upon the transformed alternative data, and making the results available to the client for rebuilding a final result for the alternative client data by a reverse transformation on the calculated results using the principle of IIA.

In a further aspect of the invention the alternative client data can be comprised of random alternatives combined with original alternatives and this combination can be split into a plurality of sub-lists. Further, the rebuilding can be done on the plurality of sub-lists. In addition, each of the plurality of sub-lists can be processed concurrently. Also, the matching results can be calculated using a Multinomial Logit Model (MNL), and the matching system can be applied to workforce scheduling tasks, financial product recommendation tasks, and the like.

In a further aspect, the invention can be implemented as a system which, on the client side, has a processing unit for transforming alternative client data using the principle of Independence of IIA, a communications channel for receiving results of a matching calculation upon the transformed alternative data, and a processing unit for rebuilding a final result for the alternative client data by a reverse transformation on the calculated results using the principle of IIA. Such a system can be implemented by a cloud service provider in a computer system node configured to receive transformed alternative client data and coefficient beta for executing the matching calculation in a processing unit and configured with an interface to make the results of the calculation available to the client for rebuilding a final result for the alternative client data by a reverse transformation on the calculated results using the principle of IIA.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a diagram of tables showing how a matching system may be applied to a workforce scheduling task.

FIG. 2 is a diagram of tables showing how a matching system may be applied to associate appropriate financial products with customers.

FIG. 5 is a diagram of tables showing how the client transforms alternative data in accordance with the property of Independence of Irrelevant Alternatives.

DETAILED DESCRIPTION OF A PREFERRED EMBODIMENT OF THE INVENTION

Figure 1A:
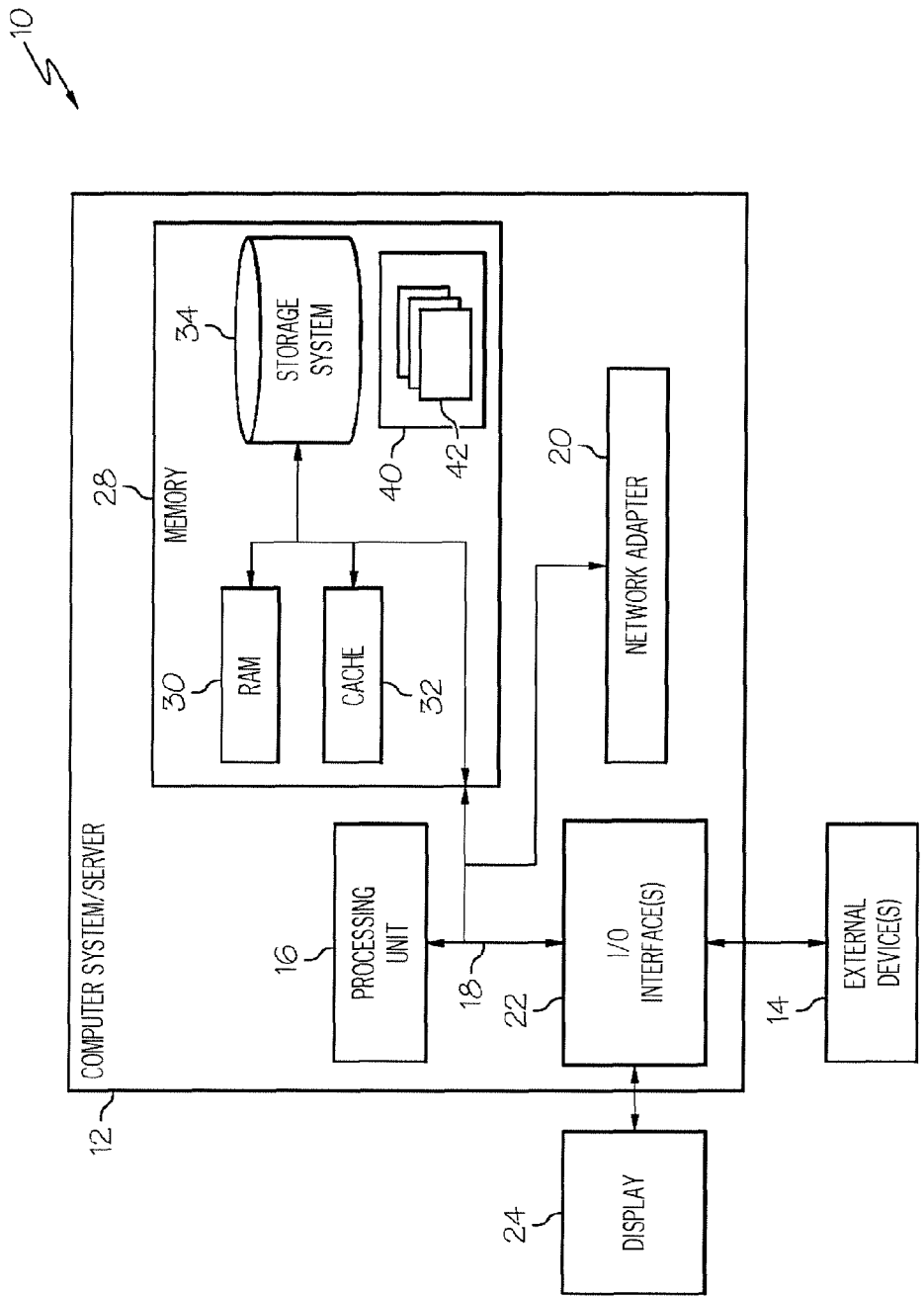
FIG. 1A is a diagram showing a cloud computing node capable of being used by a service provider to implement an embodiment of the present invention.

Logit models, especially Multinomial Logit Model (MNL), one of the most widely used discrete choice models, are applied to matching systems in various business analytics systems.

Given the utility function, the probability that the item n should choose alternative i instead of alternative j is $$P_{ni} = Prob(U_{ni} > U_{nj})$$
$$= Prob(V_{ni} + \epsilon_{ni} > V_{nj} + \epsilon_{nj})$$
$$= Prob(\epsilon_{nj} < \epsilon_{ni} + V_{ni} - V_{nj})$$

In the case of MNL, it can be concluded that $$P_{ni} = \frac{e^{V_{ni}}}{\sum_j e^{V_{nj}}}$$

In the special case that function V is modeled as a linear function, the model is $$P_{ni} = \frac{e^{x_{ni}\beta}}{\sum_j e^{x_{nj}\beta}}$$

The coefficient vector beta ($\beta$) is the key to the matching system and is generated by advanced algorithms, market investigation, and/or experts' experience.

Workforce Scheduling Example

The branch workforce scheduling system is based on a matching system that chooses a suitable teller for each shift. As shown in FIG. 1, Table 110 shows a list of tellers (in column 111) and their information (pay grade 112, proficiency level 113 for business type 1, proficiency level 114 for business type 2, and proficiency level 115 for business type 3) and Table 120 shows one shift (in column 121) and its information (work load 122 for business type 1, work load 123 for business type 2, and work load 124 for business type 3). Both Table 110 and Table 120 may contain confidential data. For the shift shown in Table 120, the matching system uses proprietary algorithms to calculate the matching probability based on data in the tables.

Financial Product Recommendation Example

A typical recommendation system relies on a matching system to decide which customers are suitable for a given financial product.

In this case, the utility function V needs to consider both the characteristics of customers (e.g. item 210 in FIG. 2) and characteristics of the financial product (e.g. item 220 in FIG. 2). Table 210 in FIG. 2 shows a list of customers (in column 211) and their financial information (risk preference 212, savings 213, monthly income 214, and monthly expenses 215). Table 220 in FIG. 2 shows the characteristics (duration 222, risk level 223, and investment direction 224) of a particular financial product (in column 221). The matching service provider uses well-trained utility function and coefficient beta to calculate the probability that one customer is suitable for the financial product.

Putting Matching System on Cloud

Clients tend to use cloud-based matching service because: (1) the coefficient beta provided by professional companies has better quality, and can be updated timely, and (2) the load of matching system varies in a month.

Figure 3:
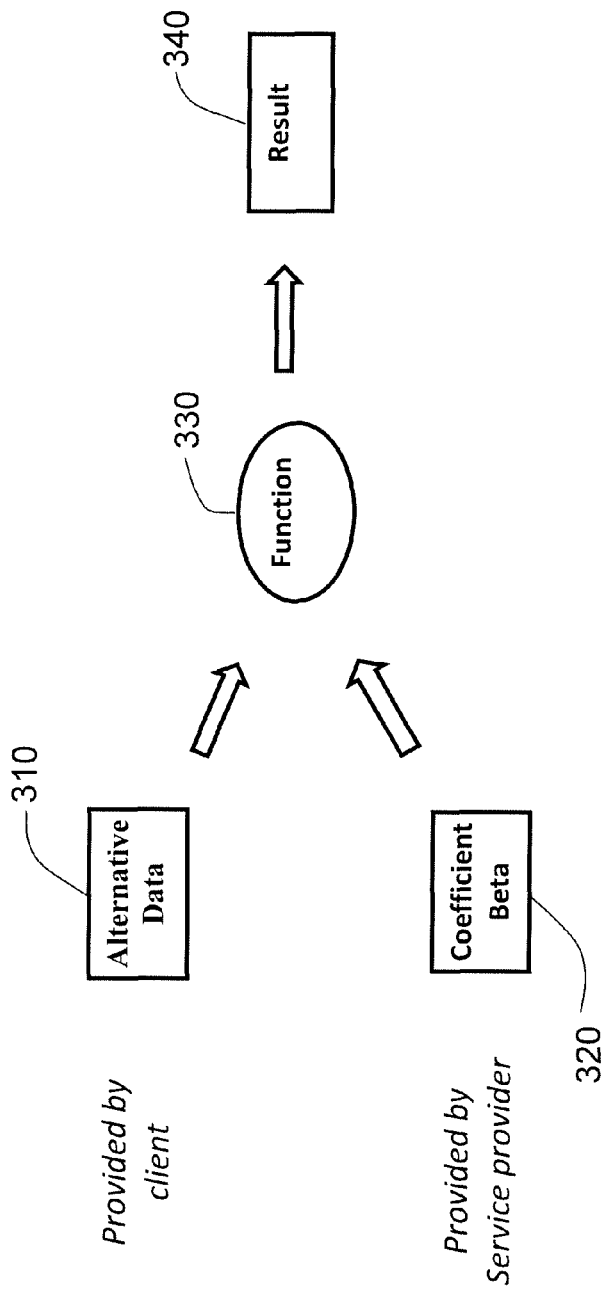
FIG. 3 is a schematic diagram showing the functional steps of a matching system placed on the cloud.

FIG. 3 is a diagram showing how a matching system on the cloud operates. Alternative data 310 provided by the client, together with coefficient beta data 320 provided by the CSP is sent to the CSP function 330, which generates the results 340. The difficulty with this scenario is that two bad options are available: (1) Transmit "alternative data" to cloud; and/or (2) Transmit "coefficient beta" to client.

In either case, sensitive data cannot be protected.

Main Idea

In order to resolve this problem the invention makes use of the property of Independence of Irrelevant Alternatives (IIA). This property implies that the relative odds between two alternatives are the same no matter what other alternatives are available. The MNL model has the IIA property, which is formally expressed by the following relationship:

$$P_{ni} = \frac{e^{V_{ni}}}{\sum_j e^{V_{nj}}} \Rightarrow \frac{P_{ni}}{P_{nj}} = \frac{\frac{e^{V_{ni}}}{\sum_k e^{V_{nk}}}}{\frac{e^{V_{nj}}}{\sum_k e^{V_{nk}}}} = \frac{e^{V_{ni}}}{e^{V_{nj}}}$$

Figure 4:
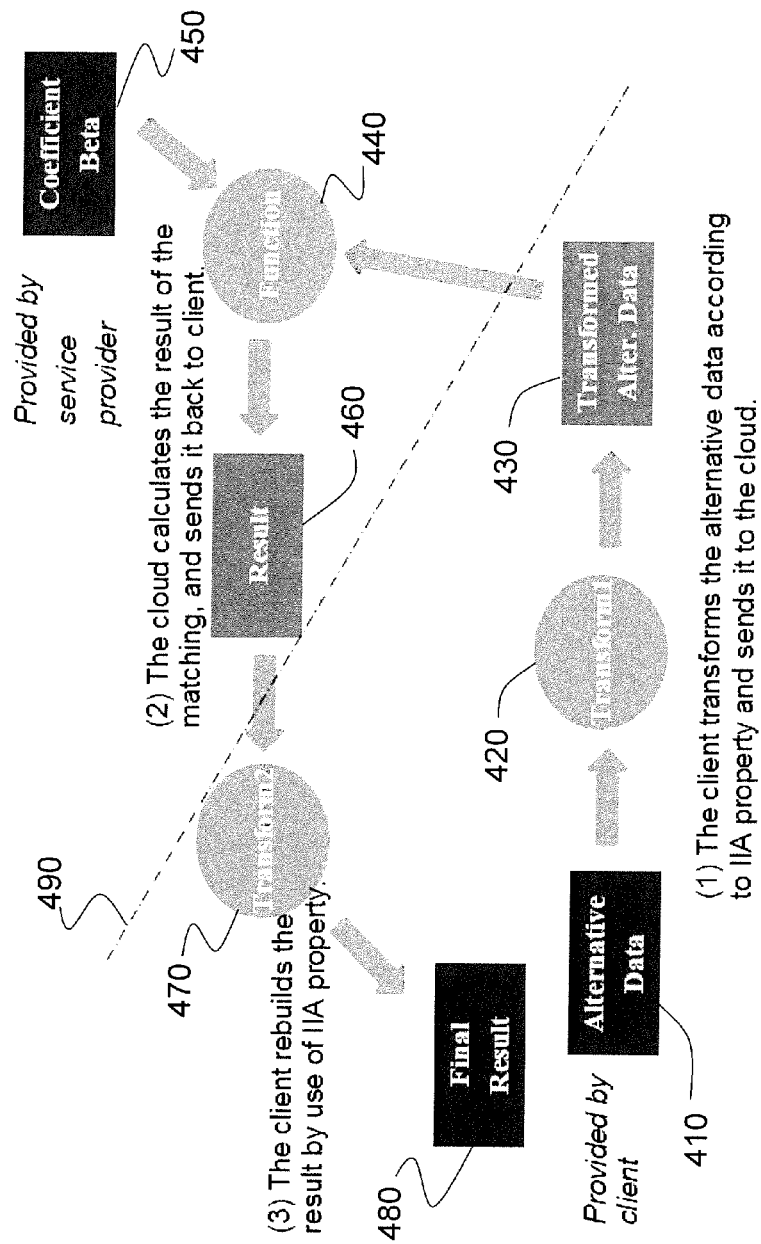
FIG. 4 is a schematic diagram showing how the invention modifies the functional steps of a cloud based matching system.

Turning now to FIG. 4, we will now describe how the invention operates to protect the sensitive data of both the client and the cloud service provider. Alternative data 410 provided by the client is transformed 420 according to the IIA property. The transformed alternative data 430 is then provided to the cloud function 440 across a communications boundary 490. With coefficient beta 450 provided by the cloud service provider, function 440 then generates matching results 460 and sends these results back to the client across communications boundary 490. The client then uses a second transformation 470 to rebuild the results 460 into the final result 480 by use of the IIA property. The client transformations 420 and 470 may be performed by the client using a computer system such as described hereafter in FIG. 1A. The client's computer system for performing these transformations may or may not be located in a cloud.

The transformation 420 consists of two steps. The first step 515 is to randomly generate some fake alternatives and add them into the alternative list 510 (shown in FIG. 5). In the transformed alternative data 430 (as illustrated by list 520 in FIG. 5), most alternatives are fake and only a small portion of them are real, the CSP cannot distinguish which alternatives are real, such that the real data can be protected.

For example, to protect the pay grade data in Table 110, the transformation 420 can generate fake alternatives with different pay grades.

The second step 525 is to split the alternative list 520 to several sub-lists 530, 540, 550. To make sure that the result can be reverse transformed in further steps, some alternatives should be simultaneously put in multiple sub-lists, for example, alternatives with ID=2 and ID=4 in FIG. 5. Two sub-lists are defined to be directly connected if the two sub-lists contain at least one common alternative. If a path (sub-list $k_1$, sub-list $k_2$, . . . , sub-list $k_n$) from sub-list $k_1$ to sub-list $k_n$ can be found where any two adjacent sub-lists are directly connected, sub-list $k_1$ and sub-list $k_n$ are defined to be connected. It must be guaranteed that all sub-lists are connected in transformed alternative data 530, 540, 550.

Figure 6:
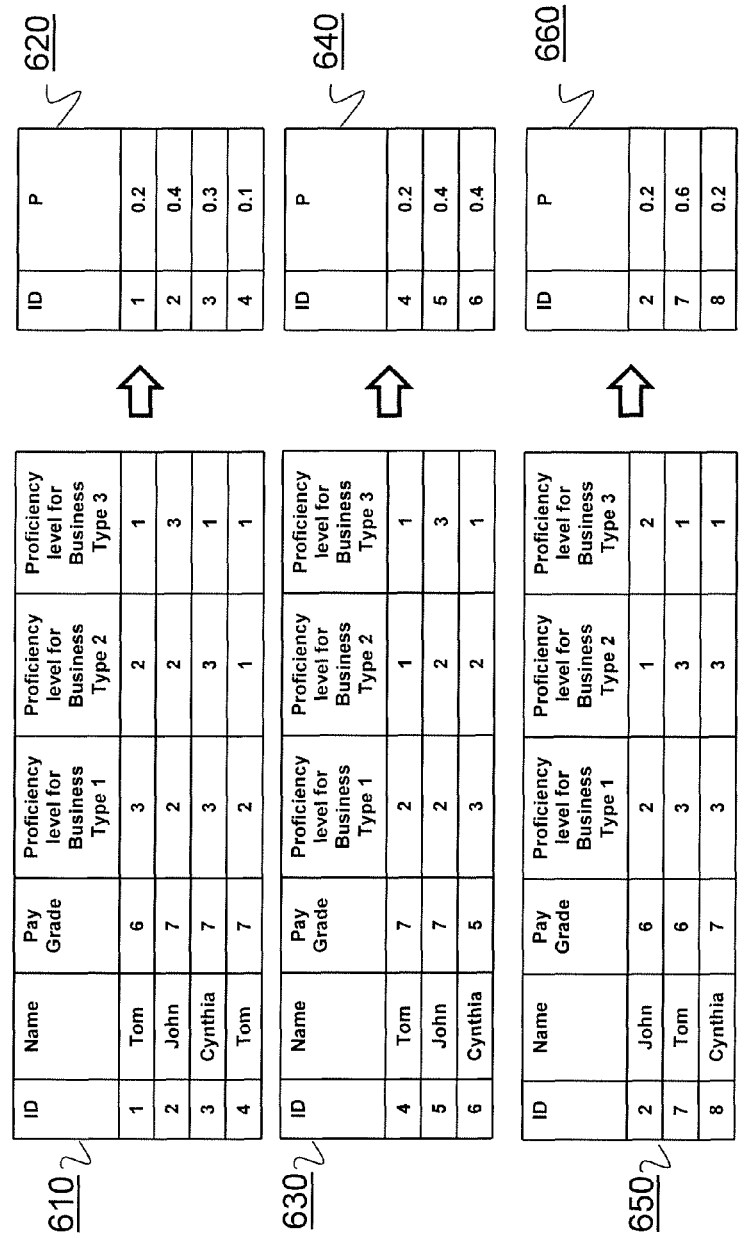
FIG. 6 is a diagram of tables illustrating how the cloud calculates matching results, which are then sent back to the client.

The CSP generates the matching result based on its utility function 440 and coefficient beta 450. As shown in FIG. 6, sub-lists 610, 630, 650 are calculated separately, and the corresponding results are Tables 620, 640, 660. The calculation can be processed in parallel.

Figure 7:
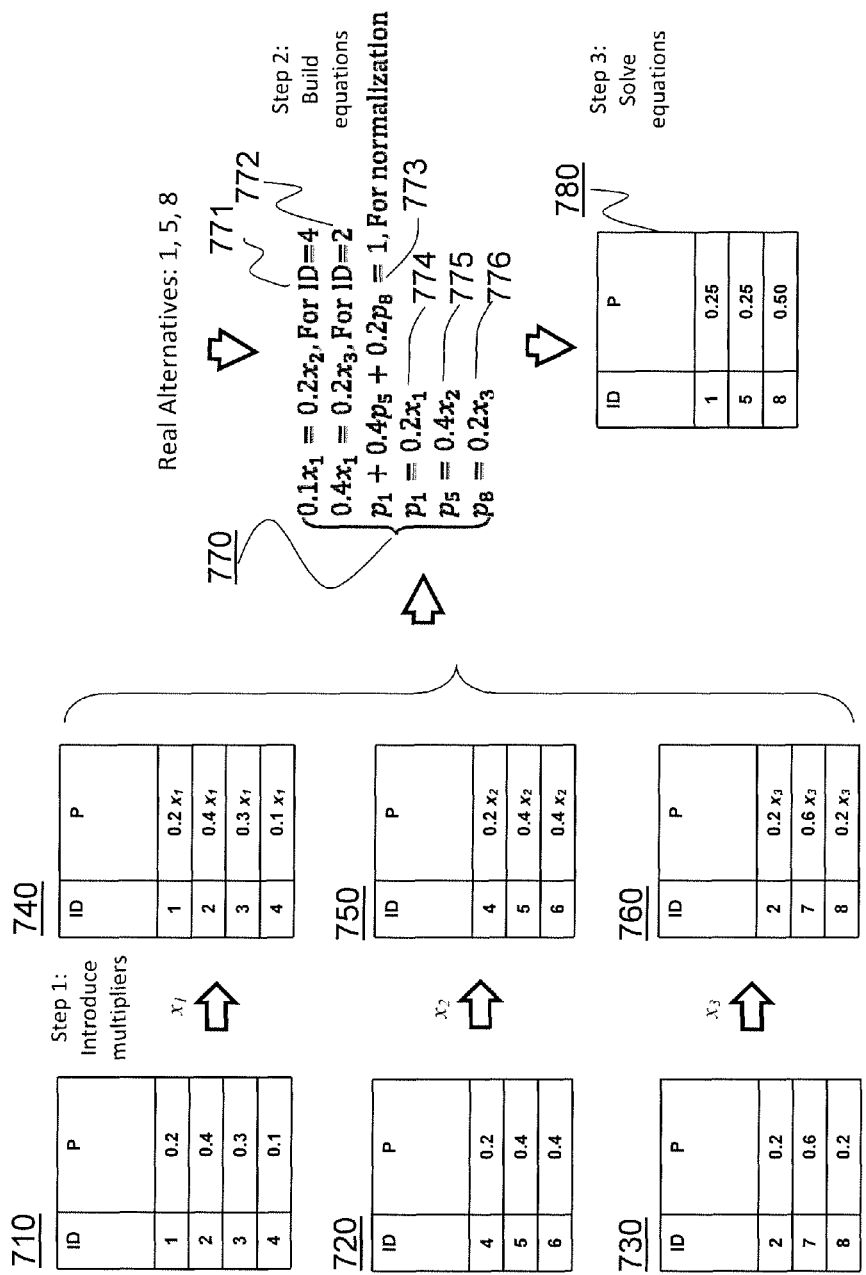
FIG. 7 is a diagram of tables illustrating how the client transforms the results provided by the CSP, in accordance with the property of Independence of Irrelevant Alternatives, so that the results can be applied to the original data.

The transformation 470 combines the matching result 460 to final result 480. It contains three steps. The first step is to introduce multipliers. Turning now to FIG. 7, for each sub-list result t shown as 710, 720, 730, we define $x_t$ to be a multiplier, and multiply each sub-list result by its multiplier, as shown in 740, 750, and 760.

The second step is to build equations 770. For each alternative that appears in multiple sub-lists, an equation is added to make sure its probabilities in different sub-lists are equal, as shown in Equations 771 and 772. The summation of all real alternatives should be equal to one for normalization, as shown in Equation 773. For each real alternative (ID=1, ID=5, ID=8), its probability result in 740, 750, and 760 are added, as shown in Equations 774, 775 and 776. According to the IIA property, adding randomly generated alternatives or removing some irrelevant alternatives in the list cannot affect the relative ratio of probabilities of two alternatives, so the result can be proven to be correct.

The third step is to solve the equations to get the probability results, shown in Table 780.

The detailed procedure is:

Step 1: The client transforms 420 the alternative data and sends it to the cloud.

Step 1.1. Randomly generate M new alternatives and add them into the alternative list 510.

Step 1.2. Randomly split the alternative list 520 to several sub-lists (530, 540 and 550) and make sure all sub-lists can be connected.

Step 2: The cloud calculates 440 the result of the matching, and sends it back to client.

Step 2.1. For each sub-list (610, 630, 650), the matching server on the cloud uses its coefficient beta to calculate the result $P_{ni}$ for each alternative.

Step 2.2. The result of each sub-list (620, 640, 660, respectively) is returned to the client separately.

Step 3: The client rebuilds 470 the result by using the IIA property.

Step 3.1. Scale the result of each sub-list t (710, 720, 730) by multiplying a variable $x_t$, as shown in 740, 750, 760.

Step 3.2. Generate linear equations in 770.

Step 3.3. Solve equations 770 to build the result 780 of the original alternatives.

Advantages

The advantages of the foregoing methodology for cloud based matching systems are as follows:

"Alternative data" has been transformed such that client needn't worry about the possibility that the cloud service provider would steal their sensitive data and use it improperly.

"Coefficient beta" vector data is retained in the cloud server such that cloud service providers needn't worry about the possibility that clients would steal their calculation parameters and free themselves from the cloud service provider.

The cloud server can only obtain the transformed "alternative data" 430, which has limited information and cannot be used to gain improper business values.

The result 460 calculated by the cloud service provider from the transformed "alternative data" 430 can be transformed 470 reversely to apply the result to the original data, which can be used easily by the client.

A single matching task can be split into several parallel tasks to take advantage of concurrent computation.

The cloud computing environment available to the cloud service provider is comprised of a plurality of interconnected computer system nodes, each one of which may be described as shown in FIG. 1A. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12, such as, for example, a personal digital assistant (PDA) or cellular telephone, desktop computer, laptop computer, and/or automobile computer system; and/or any devices (e.g., network card, modem, etc.) that enable computer system/server 12 to communicate with one or more other computing devices.

Nodes 10 may communicate with one another. They may be grouped (not shown) physically or virtually, in one or more networks, such as Private, Community, Public, or Hybrid clouds as described hereinabove, or a combination thereof. This allows a cloud computing environment to offer infrastructure, platforms and/or software as services for which a cloud consumer does not need to maintain resources on a local computing device. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
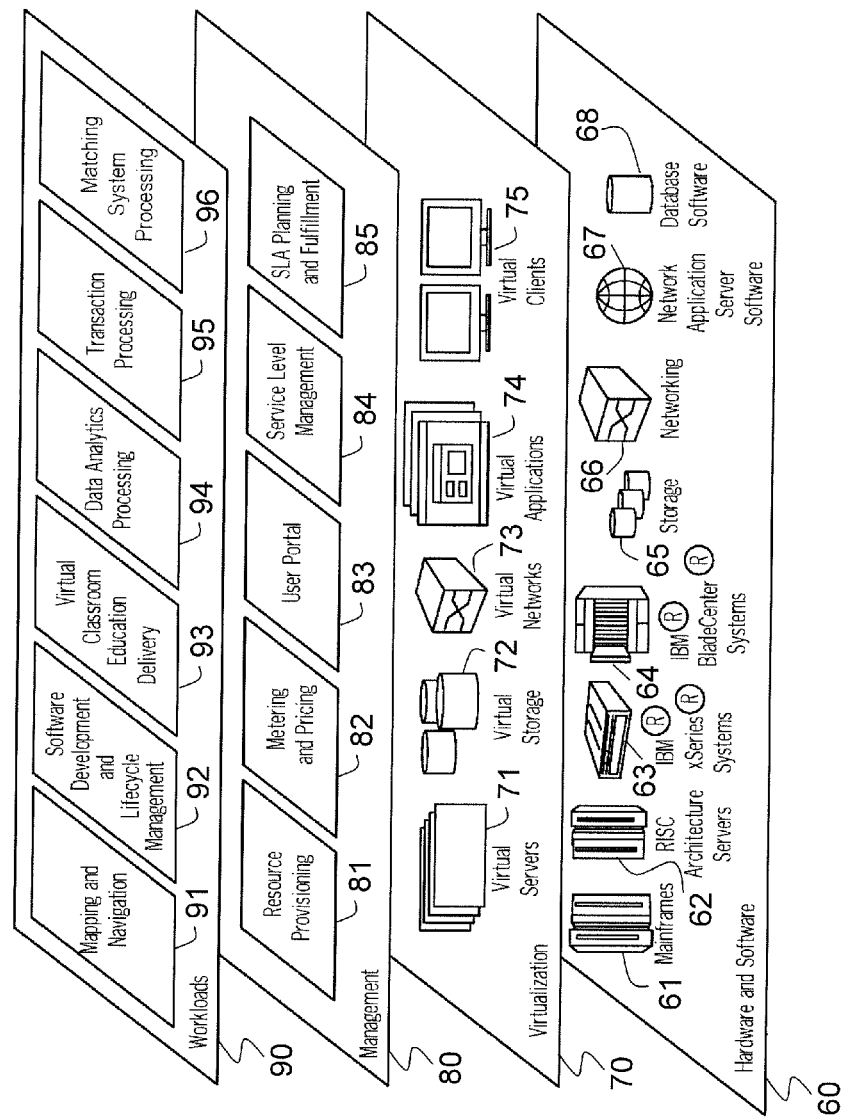
FIG. 1B is a diagram showing model abstraction layers applicable to a cloud computing environment and the place of a matching system within such abstraction layers.

Referring now to FIG. 1B, a set of functional abstraction layers provided by cloud computing environment is shown. It should be understood in advance that the components, layers, and functions shown in FIG. 1B are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and matching system processing, in accordance with the present invention.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method for client proprietary data protection and protection of coefficient beta produced by proprietary algorithms of a cloud service provider (CSP) in a cloud-based matching system, comprising the steps of:
   providing by a client computer system alternative data representing the client proprietary data to be protected,
   performing a first transformation by the client computer system of the alternative data using a principle known as Independence of Irrelevant Alternatives (IIA), wherein the first transformation comprises two steps:

first step is randomly generating some fake alternatives and adding them into an alternative list, wherein, in the transformed alternative data, most alternatives are fake and only a small portion of the alternatives are real such that the CSP cannot distinguish which alternatives are real, thereby protecting the real data, and second step is splitting the alternative list into several sub-lists, wherein to make sure that a result can be reverse transformed in further steps, some alternatives are simultaneously put in multiple sub-lists, two sub-lists being defined to be directly connected if the two sub-lists contain at least one common alternative, transmitting by the client computer system the transformed alternative data to the CSP across a communications boundary, generating by the CSP matching results based on a utility function of the CSP and the CSP coefficient beta, matching results for each of the sub-lists being calculated separately and corresponding results, sending matching results generated by the CSP back to the client computer system across the communications boundary, performing by the client computer a second transformation to rebuild the result into a final result by use of the IIA property, the second transformation comprising three steps:

first step is introducing multipliers for each sub-list, each sub-list being multiplied by its multiplier, second step is building equations, wherein for each alternative that appears in multiple sub-lists, an equation is added to make probabilities for each such alternative in different sub-lists equal, the summation of all real alternatives being equal to one for normalization, for each real alternative, adding its probability results so that according to the IIA property, adding randomly generated alternatives or removing some irrelevant alternatives in the list does not affect the relative ratio of probabilities of two alternatives, so the result can be proven to be correct, and third step is to solve the equations to get the probability results, wherein the client computer system sends the transformed alternative data to the CSP without disclosing transformation of the alternative data using the IIA property to the CSP; and the CSP sends matching results to the client computer system without disclosing coefficient beta data to the client computer system.

2. The method of claim 1, wherein the matching results are calculated using a Multinomial Logit Model (MNL).

3. The method of claim 1, wherein the matching results are generated for application to a workforce scheduling task.

4. The method of claim 1, A wherein the principle of IIA is defined as $$\frac{P_{ni}}{P_{nj}} = \frac{e^{V_{ni}}}{e^{V_{nj}}} = C_{ij}$$

where $P_{ni}$ is a probability that item n should choose alternative I instead of alternative j, $V_{ni}$ is a function of factors considered by the matching system, and $C_{ij}$ is a constant that is irrelevant to alternatives except alternative I and alternative j.

* * * * *